United States Patent [19]

Arntz

[11] 4,002,553
[45] Jan. 11, 1977

[54] APPARATUS FOR THE SEPARATION, AND STORAGE OF HYDROGEN GAS

[76] Inventor: Friedrich Ottokar Wilhelm Arntz, Rte. No. 1 Summit Grove, Clinton, Ind. 47842

[22] Filed: Mar. 4, 1976

[21] Appl. No.: 663,783

Related U.S. Application Data

[63] Continuation-in-part of Ser. No. 586,648, June 13, 1975, abandoned.

[52] U.S. Cl. .............................. 204/278; 23/260; 55/17; 55/18; 55/158; 55/212; 55/DIG. 30; 204/275
[51] Int. Cl.² ...................... C25B 1/02; C25B 1/04
[58] Field of Search ................ 55/17, 18, 158, 212, 55/DIG. 30; 204/275, 278; 23/260

[56] References Cited

UNITED STATES PATENTS

| | | | |
|---|---|---|---|
| 1,380,183 | 5/1921 | Bolsen | 204/278 |
| 2,958,391 | 11/1960 | DeRosset | 55/158 |
| 3,630,001 | 12/1971 | Hamerski | 55/158 |

*Primary Examiner*—Bernard Nozick

[57] ABSTRACT

This invention pertains to a new type of method and apparatus for separating, accumulating, compressing and subsequently storing hydrogen gas in a gas column separator system, whereby the lighter and lower density gas hydrogen may be pumped from the top of the column and the change in gas difference, when the higher density and heavier gas appears is sensed thus, automatically stopping the hydrogen gas compressor pump motor unit until the hydrogen gas in the top gas cells is replenished and sensing units probing such hydrogen content subsequently instruct aforementioned hydrogen compressor pump motor unit to resume pumping, such functions being in interaction with the operation of a hydrolizer unit, water supply pump, storage unit, and power supply means.

10 Claims, 1 Drawing Figure

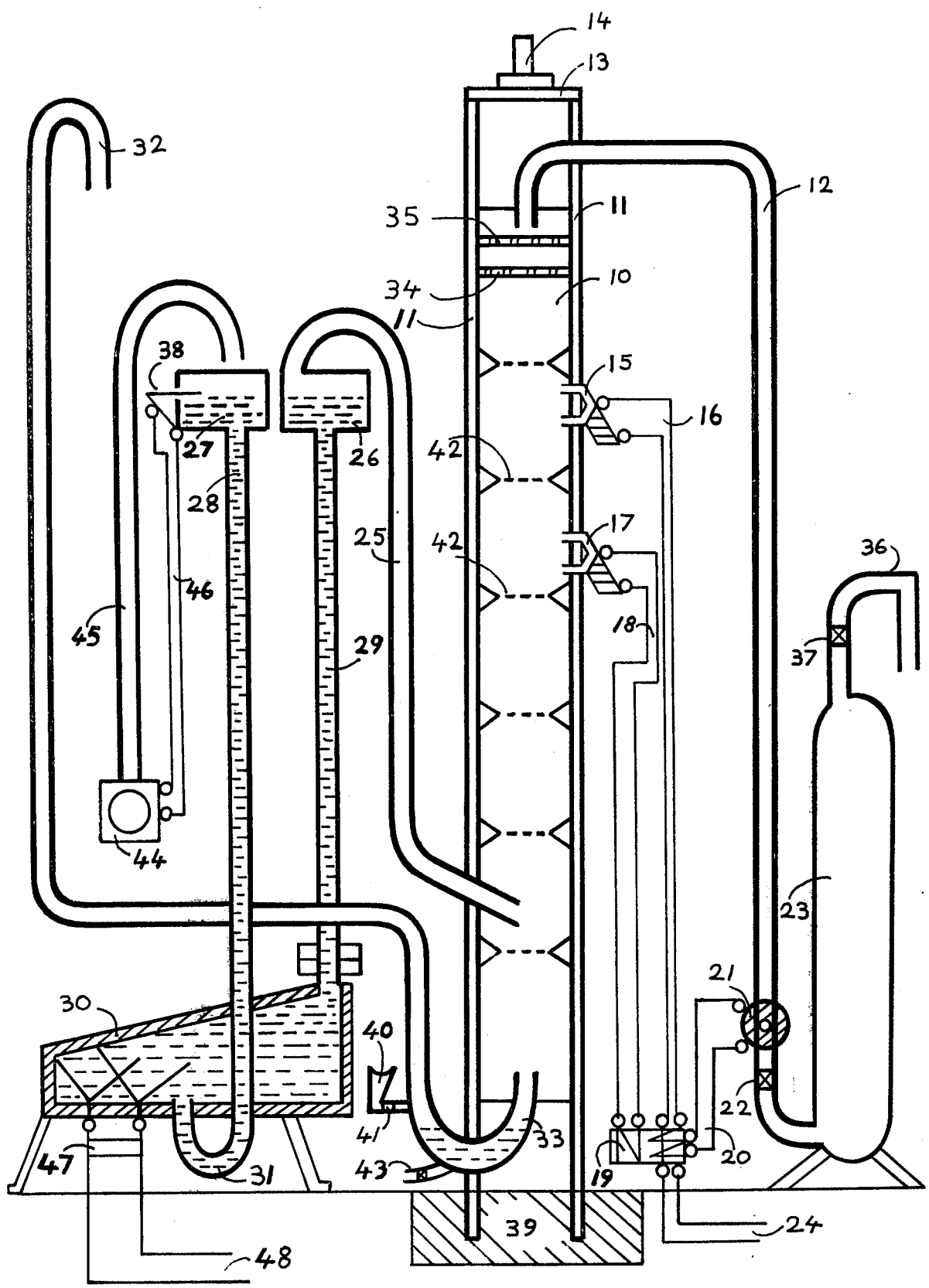
U.S. Patent     Jan. 11, 1977     4,002,553

(54)

APPARATUS FOR THE SEPARATION, AND STORAGE OF HYDROGEN GAS

This application is a continuation-in-part of Ser. No. 586,648 filed June 13, 1975 and now abandoned.

BACKGROUND OF THE INVENTION

1. Field of the Invention

The invention relates to the production and storage of hydrogen, and more particularly to a method and apparatus for separating, accumulating, compressing and storing hydrogen gas with a minimum amount of attendance.

2. Description of the Prior Art

Present methods of separating hydrogen are by various chemical processes or by pressure differential and filtering processes.

SUMMARY OF THE INVENTION

It is an object of this invention to provide a method and apparatus for separating, accumulating, compressing and storing hydrogen gas whereby this may be done automatically and reliably. These and other objects are preferably accomplished by filling a vertical gas container column with a mixture of gases containing among others hydrogen gas, wherein aforesaid vertical gas container column consists of a number of gas container cells interconnected to each other, each cell separation membrane having one or more orifices allowing a free flow gas movement up and down within the column, further wherein by having to pass through the separator cell membrane orifices such flow of gas taking place very slowly and consequently diminishing any developing gas turbulence within the gas cell column, and further wherein the lower density and lighter gas hydrogen may be pumped from the column and the change in gas layer content, when the higher density heavier gas appears is sensed thus, automatically stopping the pumping out and subsequent compression of gases. This is being done in a manner which allows for a definite wide safety margin by using two or more probes or sensing units.

BRIEF DESCRIPTION OF THE DRAWING

The drawing is a vertical sectional, partly-schematic view of preferred apparatus for carrying out the techniques of my invention.

DESCRIPTION OF THE PREFERRED EMBODIMENT

Referring to the drawing a gas cell column tower 10 is shown, which is held in a vertical position by being anchored vertically in a concrete base 39 at ground elevation. Gas cell column tower 10 is affixed with reinforcing structural members 11 and is affixed at it's top end with a means 13 to provide a base for a vertical bearing shaft 14 which may be used to attach a wind-turbine device to tower 10. Tower 10 contains numerous cells one placed on top of the other which thusly put together represent a hollow, airtight container positioned vertically and subdivided into numerous cells. Each cell is in gaseous communication with the adjoining cell by a number of orifices each cell separation membrane 42 is equipped with. 35 and 34 are gas turbulence dissipation membranes placed underneath hydrogen suction line 12. 21 is a motor compressor pump which is activated periodically and sequentially subject to sensing reaction of oxygen content sensing probe units 15 and 17. 22 is a check valve set between compressor unit 21 and hydrogen storage tank 23. 36 is a ventline equipped with pressure relief valve 37. 15 and 17 are connected to electric control box 19 by control connections 16 and 18. 24 and 20 are supply current leads for compressor unit 21. 33 is a waste gas exhaust line portion shaped like a U-tube which is affixed with filler pipe 40 and shut off valve 41, and also drain valve 43. Line 32 is the remainder of the waste gas exhaust line connecting into 33. The bottom section of U-tube 33 contains a volume of water for the purpose of acting as a flame retarder and to take on the function of a liquid check valve. 33 originates from a point at the bottommost segment of cell column 10 connecting into the remaining exhaustline segment 32 the eventual exhaust orifice of which ends at an elevation equal or close to the top elevation of hydrogen suction line 12. 25 is a gas mix feed line leading from the gas mix bubble chamber 26 and discharging into the gas cell column at an elevation near it's bottom segment. 29 is the gas mix bubble chamber column line connecting to hydrolizer unit 30. 27 is filler tank for water feed column line 28. 31 is the U-shaped segment of water feed column line 28 connecting into the hydrolizer unit 30 at it's bottom. 38 is water level sensor unit attached to filler tank 27. 44 is watersupply pump for 27 shown with pipe connection 45. 46 are sensor unit control connections to 44. 47 is hydrolizer feed current interruptor unit. 48 are feed current leads for hydrolizer unit 30. In operation the apparatus and method herein described functions as follows: Hydrolizer unit 30 fractures water contained in this unit into hydrogen, oxygen and other gases. This gas mix automatically rises upwards into the gas mix bubble chamber 26 through bubblechamber column line 29. From chamber 26 this gas mix by being slightly pressurized continues into gas cell column 10 and enters it at an elevation somewhere near the bottom segment of column 10. The gas column 10 now is being filled with aforesaid gas mix. Since hydrogen is lighter than any other gases it tends to collect and concentrate in the top part of said gas cell column. Since during this process the gas cell column is absolutely airtight against the outside atmosphere the herein as wastegas considered gases oxygen, nitrogen et al now concentrated at the bottom part of the gas cell column are slowly exiting out of 10 through the water lock or check contained in 33. When the hydrogen gas concentration becomes strong enough to displace all remnants of oxygen contained in the gas cell which sensor probe unit 17 is inserted into and said sensor probe then triggers a switching mechanism that in turn switches current to motor compressor unit 21 the concentrated hydrogen gas in the upper cell or cells of 10 is subsequently pumped out through suction line 12. When the hydrogen content concentration within the gas cell which sensor probe 15 is inserted into reaches a level of dilution with oxygen sensor probe 15 will then trigger the switch mechanism in control box 19 to interrupt the feed current to motor compressor pump 21 until such time that sensor probe 17 again senses the concentration of hydrogen content in it's gas cell to be totally devoid of oxygen and therefore starting another pumping cycle as described before. It goes without saying that there may be sensors attached to this system for other functions such as for instance a sensor that triggers a complete shutdown of the whole apparatus after storage tank 23 is filled completely at a predetermined pressure setting. The purpose for unit 47 is to, by interrupting the feed current to hydrolizer cell 30 periodically, allow the gas bubbles attendant to the electrolysis process to overcome tendency of the cathode respectively anode part of unit 30 to overly attract such bubbles by the ionization effect, therefore allowing the gas bubbles to rise more freely into bubble chamber 26. Also it should be self evident how sensing unit 38 would trigger water supply pump 44 when the water level in tank 27 is below the predetermined elevation. 40 and 41 of course are for refilling knee segment 33 when it becomes necessary, which function could also be made automatic. 34 and 35 are the gas turbulence dissipation membranes which are there for the purpose of pumping the hydrogen gas in a complete layer rather than as a turbulent and therefore diluted mass of gas.

What I claim as new and desire to secure by Letters Patent of the United States of America is:

1. Apparatus for separating, accumulating, compressing and storing hydrogen gas comprising:

a vertical, airtight gas cell container column wherein the individual gas cell containers are stacked one on top of the other, each gas cell being in gaseous communication with the adjoining cell;

a means to keep said gas cells separated from each other yet in gaseous communication;

a structural means to keep said gas cell container column in a stable vertical position;

a waste gas exhaust duct exiting said gas cell container column at an elevation at or near it's bottom said waste gas exhaust duct within it's bottom segment including a means to effect a check valve effect;

a segment at the bottom of waste gas exhaust duct at the exit point out of gas cell container column having a U-tube configuration wherein the bottom part of said U-shaped duct is kept filled with a volume of liquid which assumes the function of a check valve;

a motor compressor pump connected to a hydrogen outlet suction duct exiting at the top of aforesaid gas cell container column aforesaid motor compressor pump pumping hydrogen gas periodically into a storage tank wherein a check valve is inserted into the duct connection between motor compressor pump and the storage tank;

a gas mixture input feed duct discharging into the gas cell container column at an elevation near the lower segment of said gas cell container column;

a means to channel electric signals in conjunction with electric feed current switching mechanism to hydrogen motor compressor which means are connected by control connections to two oxygen content sensor probe relais units inserted into two gas cells in the uppermost segment of the gas cell container column and containing switching mechanism for turning off respectively on supply current to the motor compressor pump aforesaid means to channel electric signals in conjunction with electric feed current switching mechanism, said switching mechanism turning off respectively on supply current to the motor compressor pump depending on which sensing signal it receives;

two oxygen content sensor probe relais units inserted into two gas cell containers in the uppermost segment of the gas cell container column in such a manner that the first oxygen content sensor probe relais unit is inserted into a gas cell within the upper segment of the gas cell container column, which gas cell is located at an elevation below the elevation of yet another gas cell of said gas cell container column, which said other gas cell has inserted into it the second and upper oxygen content sensor probe relais unit;

and a preprogrammed arrangement of functions wherein the first or lower oxygen content sensor probe relais unit upon finding no traces of oxygen within the gas cell it is inserted into sends a signal to the electric control means which effects the switching on of supply current to the motor compressor pump and wherein the second or upper oxygen content sensor probe relais unit upon subsequently finding traces of oxygen within the gas cell it is inserted into sends a signal to the electric control means which effects the switching off of the supply current to the motor compressor pump thereby stopping the hydrogen pumping action until the hydrogen content is concentrated enough again to repeat the pumping cycle of the compressor, further wherein upon sensing a complete absence of oxygen in it's gas cell after the hydrogen in the upper gas cell containers has been replenished the first or lower oxygen content sensor probe relais unit sends a corresponding signal again to the electric control signal conductors thereby switching on supply current again to the motor compressor pump repeating aforementioned function and followed by the second or upper oxygen content sensor probe relais unit again sending a switch-off signal to the electric control signal conducting means and switching mechanism upon the recurrence of oxygen dilution in it's cell.

2. Apparatus according to claim 1 having a number of gas turbulence dissipation membranes placed underneath the hydrogen outlet suction duct.

3. Apparatus according to claim 1 having a U-tube shaped waste exhaust gas duct which at the U-tube configuration is equipped with a water filler pipe stub with built-in shut-off valve and having at the bottom most part of said U-tube-shaped gas exhaust duct a drain valve inserted into it.

4. Apparatus according to claim 1 having a hydrolizer unit being equipped with a feed water conducting line feeding water into said hydrolizer at it's bottom in such a manner that the inlet segment of aforementioned feed water conducting line is U-shaped the bottom part of the U-shaped segment being substantially lower than the bottom part of the hydrolizer unit, and wherein said feed water conducting line extends upwards ending in a filler tank which elevationwise is located substantially higher than the hydrolizer unit, aforementioned filler tank being equipped with a water level sensor having control connections to a supply water pump said water level sensor unit being preset to effect and maintain a predetermined water level in aforesaid filler tank, and further wherein aforesaid hydrolizer unit is also equipped with a gas mix bubble chamber column duct exiting from an upper gas collection area within the hydrolizer unit and extending upwards and ending in a gas mix bubble chamber the water level of which is identical to the waterlevel of aforesaid feed water duct filler tank and wherein the gas mix bubble chamber discharges the gas mix into a gas mix feed duct exiting the gas mix bubble chamber at it's top section, said gas mix feed duct discharging further on into the gas cell container column at an elevation in the lower segment of said gas cell container column.

5. Apparatus according to claim 1 having a gas cell container column equipped with a stabilizing support structure which structure is equipped at it's top section with a means to support a mount for a vertical bearing shaft meant for a windturbine device.

6. Apparatus according to claim 1 wherein the separation membrane between the gas cell which has inserted into it the first or lower oxygen sensor probe relais unit and the gas cell which has inserted into it the second or upper oxygen content sensor probe relais unit, is left out thereby effecting the two sensor probe relais units being contained within in one large cell; one oxygen content sensor probe relais unit being located now at a lower section and one oxygen content sensor probe relais unit now being located at an upper section of aforesaid large cell.

7. Apparatus according to claim 1 wherein gas cell container column cells are separated from each other at their junctions by cell separation membranes which are penetrated by orifices to allow the flow and interchange of gas from one cell to the other.

8. Apparatus according to claim 7 wherein the individual gas cells at their respective junction ends are sloping from their side walls towards aforesaid cell separation membranes thereby effecting a funnel effect.

9. Apparatus according to claim 1 wherein a waste gas exhaust duct exiting said gas cell container column near it's bottom segment is equipped with a U-tube configuration segment at it's point of exit out of the gas cell container column wherein the bottom segment of said U-shaped waste gas exhaust duct is kept filled with a volume of liquid which assumes the function of a check valve and flame retarder.

10. Apparatus according to claim 9 wherein a U-tube configuration segment of the waste gas exhaust duct has within it's U-tube bend a section of duct of larger diameter than the remainder of said waste gas exhaust duct.

* * * * *